(12) United States Patent
Kimmel et al.

(10) Patent No.: US 7,113,617 B2
(45) Date of Patent: Sep. 26, 2006

(54) METHOD OF COMPUTING SUB-PIXEL EUCLIDEAN DISTANCE MAPS

(75) Inventors: Ron Kimmel, Haifa (IL); Ron P. Maurer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1018 days.

(21) Appl. No.: 09/736,654

(22) Filed: Dec. 12, 2000

(65) Prior Publication Data

US 2002/0097912 A1 Jul. 25, 2002

(51) Int. Cl.
*G06K 9/00* (2006.01)
(52) U.S. Cl. .................... 382/106; 382/199; 382/299
(58) Field of Classification Search ............ 382/199, 382/106, 298, 299, 300
See application file for complete search history.

(56) References Cited

U.S. PATENT DOCUMENTS

| | | | |
|---|---|---|---|
| 4,670,892 A * | 6/1987 | Abele et al. ............... 378/4 |
| 4,712,248 A * | 12/1987 | Hongo ...................... 382/199 |
| 6,262,738 B1 * | 7/2001 | Gibson et al. ............. 345/419 |
| 6,603,484 B1 * | 8/2003 | Frisken et al. ............ 345/622 |

OTHER PUBLICATIONS

Wang et al. "An Algorithm for a Generalized Distance Transformation Based on Minkowski Operations." 9th Int. Conf. On Pattern Recognition, vol. 2, Nov. 14, 1988, pp. 1164-1168.*
Kovacs et al. "Computer Recognition of Hand-Written Characters Using the Distance Transformation." Electronics Letters, vol. 28, No. 19, Sep. 10, 1992, pp. 1825-1827.*
Lee et al. "Grid Data Generation from Contour Images by Using Euclid Distance Transformation." Int. Geoscience and Remote Sensing Symposium, IGARSS '93, vol. 4, Aug. 18, 1993, pp. 1727-1729.*
Breu et al. "Linear Time Euclidean Distance Transform Algorithms." IEEE Trans. On Pattern Analysis and Machine Intelligence, vol. 1, No. 5, May 1995, pp. 529-533.*
Jung et al. "Octree-Based Hierarchical Distance Maps for Collision Detection." IEEE Int. Conf. On Robotics and Automation, vol. 1, Apr. 22, 1996, pp. 454-459.*
Gibson. "Using Distance Maps for Accurate Surface Representation in Sampled Volumes." IEEE Symp. on Volume Visualization, Oct. 19, 1998, pp. 23-30.*
Shih et al. "Automated Fast Recognition and Location of Arbitrarily Shaped Objects by Image Morphology." Proc. CVPR '88, Ccomputer Society Conference on Computer Vision and Pattern Recognition, 1988, Jun. 5, 1988, pp. 774-779.*
Kimmel, et al, "Skeletonization via Distance Maps and Level Sets," Computer Vision and Image Understanding, 1995, vol. 62, No. 3, Nov. pp. 382-391.*

(Continued)

*Primary Examiner*—Jingge Wu
*Assistant Examiner*—Charles Kim (57) ABSTRACT

Boundary curves of a source image are identified. Each pixel of a distance map is associated with a corresponding region of the source image. Each pixel is assigned a calculated distance value corresponding to the Euclidean distance between a center of that pixel and the nearest point of the closest boundary curve. The nearest point is located to sub-pixel accuracy. A method of compressing and decompressing a source image includes the step of generating a first distance map having a first resolution. The first distance map is downsampled to generate a second distance map having a second resolution. The second distance map may be interpolated to generate an interpolated distance map having the first resolution. A soft threshold is applied to the interpolated distance map to generate a reconstructed source image having the first resolution.

19 Claims, 9 Drawing Sheets

OTHER PUBLICATIONS

Borgefors, "Using Resolution Pyramids to Efficiently Store Distance Transforms of Arbitrary Size", Proceedings of the 5th International Conference on Image Analysis and Processing, Positano, Italy, Sep. 20-22 1989, p. 691-698.*

Danielsson, "Euclidean Distance Mapping," Computer Graphics and Image Processing, Nov. 1980 vol. 14, No. 3, p. 227-48.*

* cited by examiner

METHOD OF COMPUTING SUB-PIXEL EUCLIDEAN DISTANCE MAPS

FIELD OF THE INVENTION

This invention relates to the field of image processing. In particular, this invention is drawn to computation of distance maps.

BACKGROUND OF THE INVENTION

Distance transformations are used to compute the distance between a point to an object. In image processing, for example, a distance transform may be used to compute the distance from an individual point of the image to a set of source feature points or a boundary curve in the image. The boundary curve(s) may be provided in a continuous parametric form. A continuous distance map represents the distance transform for every point in the continuous image plane. For practical applications, the distance transform values are calculated only at discrete grid locations that constitute a sampling of the continuous distance map. The resulting distance map image describes the distance between each of the grid points and a set of source feature points or boundary curves in the image which in principle are not constrained to be on the same sampling grid.

Distance maps are useful in pattern recognition and pattern matching. For example, distance maps may be used to locate an object within an image or for optical character recognition. Other applications include medical imaging (e.g., registration for 3D medical images) and generating structural "skeletons" of an object.

A number of metrics may be used by the distance transform. For example the "city block" approach measures the length ($L_1$) of the path taken in pixel increments to the boundary curve. The city block approach is based on the $L_1$ norm such that the arclength is defined as $ds=|dx|+|dy|$. The city block approach tends to preserve errors when the grid resolution is refined. The Euclidean approach is based on the $L_2$ norm such that the arclength is defined as $ds=\sqrt{dx^2+dy^2}$. Other distance transforms include the chess board, chamfer, and squared Euclidean metric.

Several methods for performing distance map calculations assume that feature points reside at the locations of the same sampling grid as the distance map (regardless of the selected distance metric). The discrete nature of the feature point location is ignored when computing the path distance so that allowable distance values can be real numbers (e.g., distance values are square roots of non-negative integers under the Euclidean metric).

Although these distance values can be calculated with great precision (corresponding to many decimal digits), the possible distance values are still a discrete set and thus have limited accuracy. As a result, the distance value may not accurately reflect the location of the boundary curve, especially at small distances of the order of the grid separation from the boundary curve. Accordingly, any distance transform method that relies on the assumption that feature points lie exactly on grid points may be inappropriate when the source feature points or boundary curves lie between grid points or pixels. Methods for computing distance maps relative to feature points on the same grid have a relatively low computational complexity O(N), where N is the number of pixels in the source image and the calculated distance map (e.g., the Danielsson four scan approach).

Alternative methods have been proposed for calculating distance maps on a grid of pixels where the boundary curve location is defined to sub-pixel accuracy (i.e., not restricted to the grid). These techniques typically propagate the "wave front" of the distance information using heap-sort operations. Thus although the resulting distance maps are potentially more accurate than techniques that limit boundary curves to grid points, one disadvantage of typical approaches to computing distance maps with sub-pixel boundary curve locations is that the computational complexity tends to increase to O(NlogN).

SUMMARY OF THE INVENTION

In view of limitations of known systems and methods, methods for generating a distance map and for compressing and reconstructing source images are described.

A method of generating a distance map includes the step of identifying a boundary curve of a source image. A distance value is assigned to each pixel associated with a corresponding region of the source image. For each pixel, the distance value represents a distance between a center of that pixel and a nearest point of the boundary curve. The nearest point is located to sub-pixel accuracy.

A method of compressing and decompressing a source image includes the step of generating a first distance map having a first resolution. The first distance map is downsampled to generate a second distance map having a second resolution. An interpolation filter may subsequently be applied to the second distance map to generate an interpolated distance map having the first resolution. A thresholding filter is applied to the interpolated distance map to generate a reconstructed source image having the first resolution.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A computationally efficient approach for generating distance transforms of images with sub-pixel accuracy is described using a Euclidean distance metric. The distance transformation is defined relative to boundary curves. Examples of features defining boundary curves include edges in a continuous tone source image, boundaries between white and black colors in a binary source image, or boundaries between two colors (e.g., foreground and background) in discrete tone source images.

The source image may be spatially continuous or spatially discrete. In a spatially continuous image, the intensity information may be defined mathematically in one embodiment. In such cases, the boundary curves may be mathematically defined (e.g., a font image presented in the form of Bézier curves).

In spatially discrete images, the intensity information is given only at discrete locations, usually corresponding to a rectangular grid (e.g., a scanned image). In such cases, the location of the boundary curves are not rigorously defined, but may be estimated from the intensity data using mathematical models. Mathematical models can estimate the location of the boundary curves to an accuracy that is much better than the grid spacing and are frequently considered as being defined in the continuous image plane.

Once the location of the boundary curves are determined, the present invention calculates a sampling of the continuous distance transformation on an imposed grid which may have a resolution that is different from any that the source image may have. The calculated distances correspond to the distances between the grid points and the modeled continuous boundary curves and are thus determined with greater accuracy than the resolution of the imposed sampling grid. As a result, the distance transformation is said to have "sub-pixel" or "sub-grid" accuracy. A method of compressing and decompressing a source image is presented as an application utilizing sub-pixel Euclidean distance maps.

Figure 1:
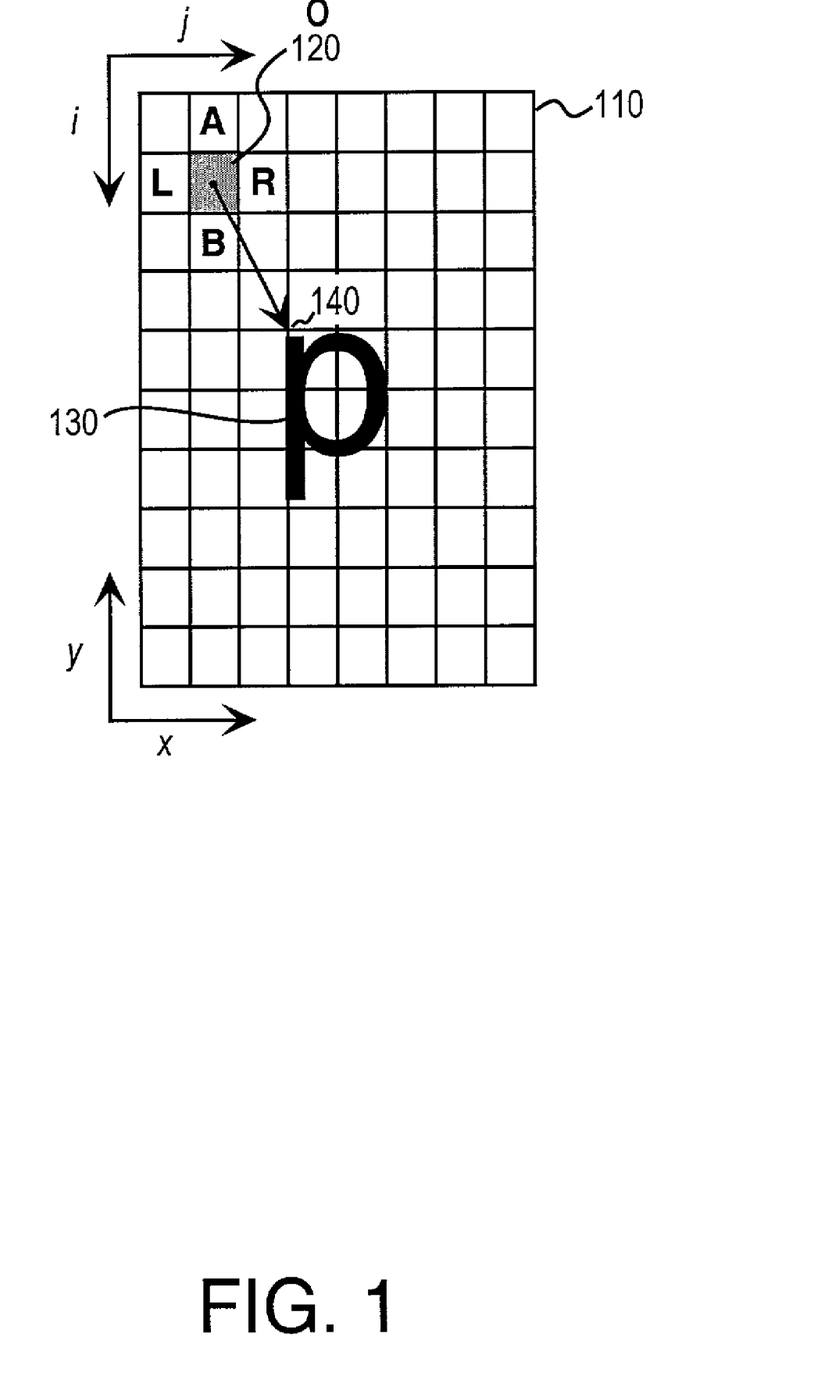
FIG. 1 illustrates a discretized image organized as a grid of pixels.

FIG. 1 illustrates discretization of a source image through application of a sampling grid 110. The source image includes boundary curves defining the letter "p" 130. The boundaries between the letter foreground and background are defined by continuous mathematical curves. The distance transformation of the image is to be calculated on sampling grid 110. The sampling grid is not constrained in any way by the source image.

The distance transform for grid point o 120 is the point-to-point distance between o and the nearest point 140 on the boundary curve(s) forming letter 130. The nearest point 140 does not necessarily reside at a pixel or grid point center. A Euclidean distance metric is illustrated for FIG. 1, however, other metrics corresponding to different functions of the x-distance and y-distance between grid point 120 and point 140 may be selected.

Point-to-point distances between a selected pixel o 120 and the nearest boundary curve 130 may be described as a function of the x-distance and y-distance between the two pixels. The nomenclature (x, y) is used to refer to locations with respect to the x-y axes of FIG. 1. The variables i and j are used when referring to pixels in a (row, column) approach. Thus the nomenclature (i, j) refers to locations within the image with respect to the i-j axes of FIG. 1.

Euclidean distance transformations have practical importance due to their direction invariance property. Generally, the Euclidean distance (d) between points (c, q) in the continuous domain $\Omega \in R^2$ is defined as follows:

$$d_e(c, q) = \|c-q\|_{L2} = \sqrt{(c_x-q_x)^2+(c_y-q_y)^2}$$

Let c belongs to the curve C: $[0,1] \to \Omega$. The Euclidean distance transform $T_C$ is defined as the map from each point q in the domain $\Omega$ to a real number $T_C(q)$ that corresponds to the Euclidean distance of q to the closest boundary point in C.

$$T_C: \Omega \to \mathcal{R}^+, \; T_C(q) = \min_{c \in C} d_e(c, q), \; \forall \; q \in \Omega$$

The resulting $T_C(q)$ is referred to as a distance map.

When the boundary curves C are closed and have an associated unique interior and exterior, then a signed-distance transform can be defined by assigning negative values to internal points and positive values to external points. The level-set $C^t$ of the distance map $T_C$ is defined as the set of all points in the domain $\Omega$ that are at the same distance t from the curve C. Each $C^t$ defines a closed curve or contour level-set:

$$\forall q \in C^t : T_C(q) = t$$

Figure 2:
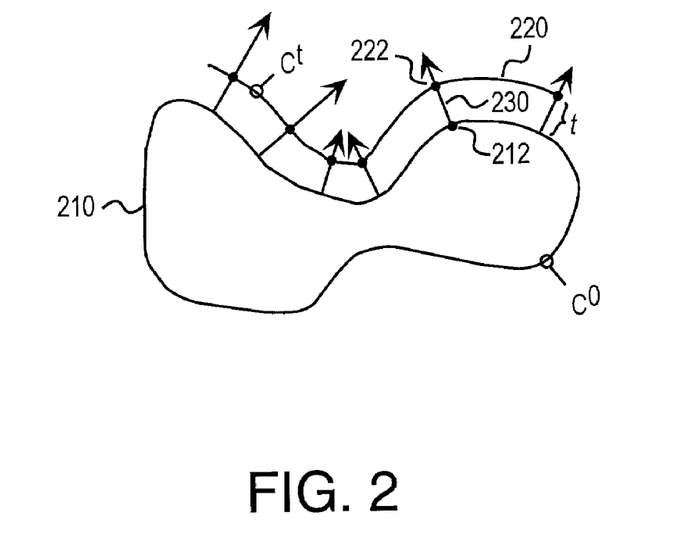
FIG. 2 illustrates boundary curve level sets.

FIG. 2 illustrates a closed curve 210. Curve 220 represents a portion of the $C^t$ level-set of curve 210. Each point 222 along curve 220 is the same distance t from the nearest point 212 on curve 210. For an image composed of a plurality of pixels, a distance map is a collection of distance values, each associated with a specific pixel. The distance values represent the distance from an associated pixel to the nearest pixel of boundary curve $C^0$. Each pixel at a distance t from the boundary curve 210, for example, would be assigned the value t.

In the continuous case, the shortest Euclidean distance between a pixel and the boundary curve is measured along a vector normal to the boundary curve. For example, vector 230 connecting point 222 on $C^t$ curve 220 with the nearest point 212 on the $C^0$ curve 210 is normal to both curve 210 and 220. Accordingly, a gradient vector can be used to create a distance map that assigns each pixel a value corresponding to the shortest Euclidean distance between the pixel and the boundary curve. The gradient ($\nabla$) vector at each point of the distance map ($T_C$) is the unit vector in the direction normal to the level-set at that point. Except for certain discontinuities, the magnitude of this unit vector equals one (i.e., $|\nabla T_C(q)|=1 \forall q$ except the points of discontinuity.)

These points of discontinuity are referred to as skeleton points. Such points may also be referred to as medial axis, Voronoi diagram edges, or edges of the pseudo-Dirichlet tessellation of the source points associated with the boundary curve. Skeleton points are equidistant from more than one point of the boundary curve. Thus skeleton points cannot have a vector that is uniquely normal to the corresponding level-set. A gradient of a point near the skeleton point, however, can be defined in a direction from which the distance information is coming.

In particular, a gradient from low to high distance values can be defined. Such derivatives are referred to as "upwind". Each skeleton point has at least two conflicting directions of information. For each direction an upwind gradient is defined. The magnitude of the upwind gradient is one, but the unit vector of the upwind gradient has a discontinuity at the skeleton point.

Figure 3:
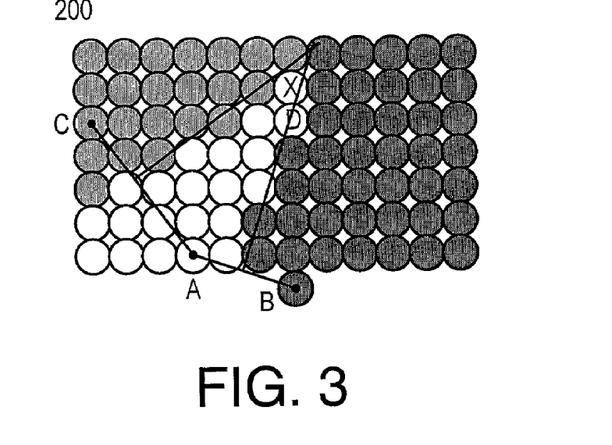
FIG. 3 illustrates a plurality of pixels shaded in accordance with the nearest feature point as determined by one embodiment of a distance map computation.

FIG. 3 illustrates an image 300 comprising a plurality of points or pixels including feature points or pixels A, B, and C. The remaining pixels are shaded in accordance with their nearest feature point associations. In ($\Delta$x, $\Delta$y) notation, point D is (0, 5) from feature point B (thus $d_e$=5) and (3, 4) from A (i.e., $d_e$=5) such that point D is equidistant from points A and B under a Euclidean pixel-to-pixel distance map. Thus point D is a skeleton point.

In one embodiment, the distance map computation is performed by solving the Eikonal equation $|\nabla T(x,y)|=1$ with the boundary condition $T_C(C)=0$, where the gradient is defined in an "upwind" fashion. The continuous Eikonal partial differential equation is approximated numerically on a rectangular grid with the spatial resolution $\Delta x = \Delta y = h$. Thus, the solution is effectively a sampling of the underlying continuous distance map T(x,y) on that grid. Referring again to FIG. 1, the nomenclature (x, y) and the variables x and y are used to refer to locations with respect to the x–y axes. The variables i and j are used when referring to pixels in a (row, column) approach. The nomenclature (i,j) similarly refers to locations within the image with respect to the i-j axes. The variable $T_{ij}$ is used to express distance values for pixels identified relative to the origin of the i-j axes rather than the x-y axes. Given that x→jh, and y→[(Nr–1)–i]h (where Nr reflects the total number of rows), the mapping of transform variables between the two co-ordinate systems is as follows:

$$T_{ij} \to T(jh, [(Nr-1)-i]h)$$

If the row numbers are zero-based then the appropriate constant is Nr–1 as illustrated, otherwise the appropriate constant is Nr+1 if the row numbers start with 1.

One step to discretization of the continuous Eikonal equation also requires discretization of the boundary conditions. The continuous boundary curves are given by an analytical expression corresponding to some model such as a polygonal curve. The distances of grid points residing close to the boundary curve may be determined through simple geometry. These grid points are referred to as static and once their distance values have been calculated, they are not permitted to change in subsequent computations. The computational time is linearly related to the number of pixels (i.e., O(N)).

The continuous solution of the Eikonal is not unique. The discretization of the Eikonal equation includes applying a viscosity requirement on the solution to ensure that the solution is unique. The viscosity requirement does not permit level-sets to self-intersect. The viscosity requirement also infinitesimally smooths "shocks." The numerical approximation of the viscosity solution is required to converge to the continuous viscosity solution as h→0.

In one embodiment, a numerical approximation to the gradient with a first order accuracy in h is applied. In particular, the numerical approximation for the equation $(\partial_x T)^2 + (\partial_y T)^2 = 1$ is defined as follows:

$$(\max(D_{ij}^{-x}T, -D_{ij}^{+x}T, 0))^2 + (\max(D_{ij}^{-y}T, -D_{ij}^{+y}T, 0))^2 = 1$$

where $$D_{ij}^{+x}T \equiv (T_{ij} - T_{i,j-1})/h$$

$$D_{ij}^{+x}T \equiv (T_{i,j+1} - T_{ij})/h$$

and $$D_{ij}^{-y}T \equiv (T_{ij} - T_{i+1,j})/h$$

$$D_{ij}^{+y}T \equiv (T_{i-1,j} - T_{ij})/h$$

The solution to this equation corresponds to propagating the distance information over the grid. The method of propagation differs from Sethian's "Fast Marching Method" and related methods. Instead of extending the distance information from the boundary curves by propagating wave fronts of distance information, the present approach propagates distance information in a π/2 section based on a small local neighborhood similar to a Danielsson four scan approach. Only four scans are needed to propagate the distance information to the entire grid. Thus the present approach provides sub-pixel accuracy with computational efficiency.

The update rule and the four scans approach are described as follows. The grid point {i, j} to be updated is denoted o. Referring to FIG. 1, the neighboring pixel above o is denoted A and corresponds to the grid point {i–1, j}. Similarly, the neighbors below (B), to the right (R), and to the left (L) correspond to the grid points {i+1, j}, {i, j+1}, and {i, j–1}, respectively.

Define the variables $m_i$ and $m_j$ as follows:

$$m_i = T(p_i) = \min(T(A), T(B))$$

$$m_j = T(p_j) = \min(T(L), T(R))$$

At o, $p_i$ is the neighboring pixel along the i-axis (i.e., A or B) that has the lower current value of the distance field T. (Note that the current value of the distance field is not guaranteed to be the true distance until the distance transformation is complete). Pixel $p_j$ is o's neighboring pixel along the j-axis that has the lower current value of the distance field T. Thus $p_j$ is either L or R. Variable $m_i$ is the transform of $p_i$ and thus indicates the minimum distance to the boundary curve from one of the above and below neighbors to o. Similarly, $m_j$ is the transform of $p_j$ and represents the minimum distance to the boundary curve from one of the grid points to the left or right of o.

Substitution of these variables and rearranging the equations yields $$[\max(u-m_j, 0)]^2 + [\max(u-m_i, 0)]^2 = h^2,$$

where u is the update value proposed for the point o. If $u \leq m_j$, then the first term is zero. Similarly, if $u \leq m_i$, then the second term is zero. This approximation ensures that the distance at each non-boundary point is higher than at least one of its four neighbors, otherwise the numerical approximation to the Eikonal equation would be contradicted such that $h^2 = 0$.

If $u > m_i$ and $u > m_j$, then both terms of the left side of the above equation are nonzero. Thus the equation simplifies to $$(u-m_i)^2 + (u-m_j)^2 = h^2.$$

In alternative embodiments, two values of h may be used to reflect the use of non-square pixels. For example, h1, h2 could reflect the x and y dimensions, respectively. For purposes of discussion, the pixels are presumed to be square with side length h.

Geometrically, this is the equation of a plane forming a 45° angle with the xy-plane (gradient magnitude equals one) and passing through the three points $\{(o,u), (p_i, m_i), (p_j, m_j)\}$. Solving the quadratic equation yields the solution:

$$u = \frac{m_i + m_j}{2} \pm \frac{1}{2}\sqrt{2h^2 - (m_i - m_j)^2}$$

The update value u proposed for the point o should depend only on the neighboring points with lower distance values which can be ensured by adding the requirement $$u \geq \max(m_i, m_j) = \frac{m_i + m_j}{2} + \frac{|m_i + m_j|}{2}$$

This requirement results in selecting the quadratic root with positive sign which leads to the following condition:

$$\sqrt{2h^2 - (m_i - m_j)^2} \geq |m_i - m_j| \rightarrow |m_i - m_j| \leq h$$

This condition ensures a positive discriminant. When $|m_i - m_j| > h$, then either $p_i$ or $p_j$ has a distance value that is inconsistent with the quadratic equation and must therefore be disregarded. In one embodiment, the update rule consistent with the numerical approximation sets $u = \min(m_i, m_j) + h$ when $|m_i - m_j| > h$.

Unlike Danielsson, the present approach propagates only the Euclidean distances. Danielsson assigns two numbers to each grid point. The two numbers indicate the relative offset of that grid point to the closest feature pixel. Danielsson uses multiple passes to propagates the absolute values of the relative coordinates of the nearest object pixel (i.e., $|dp_x|$, $|dp_y|$) from which the Euclidean distance can be deduced. The four scan approach utilized by Danielsson may similarly be used to reduce the number of computations in the present approach.

Given that the distance information propagates along straight lines, the distance information from all boundaries to all grid points can be accomplished by using four raster scans or passes on the image. The raster scans or passes and corresponding symbology is as follows: top-to-bottom ($\downarrow$), bottom-to-top ($\uparrow$), left-to-right ($\rightarrow$), and right-to-left ($\leftarrow$). Symbol pairs are then used to indicate the scanning directions. Thus a top-to-bottom-left-to-right scan is denoted $\downarrow \rightarrow$, etc. Computationally, this approach is also of the order O(N). The order of the symbols within each pair is not important.

The present approach offers the advantage of sub-pixel accuracy and sub-pixel precision distance calculations with only O(N) computational complexity. In contrast, although Danielsson's algorithm has similar computational complexity (i.e., O(N)), Danielsson offers only sub-pixel precision in calculations. The distances between two points in Danielsson may be calculated to sub-pixel precision, but the two points are always presumed to be positioned at pixel centers.

Thus the location of Danielsson's boundary curves can only be resolved to the centers of pixels nearest the boundary curve. The present approach, however, is more accurate because the distances are measured to the boundary curve rather than to the center of the pixel nearest the boundary curve. The distance values in the present approach reflect the distance between the center of a pixel and a point on the boundary curve. Thus one of the endpoints for the distance calculation in the present approach is the boundary curve itself rather than the centers of pixels near the boundary curve.

Although other techniques offer sub-pixel distance map accuracy, they require at least O(NlogN) computational complexity. Examples of such techniques include J. A. Sethian's Fast Marching Method.

Figure 4:
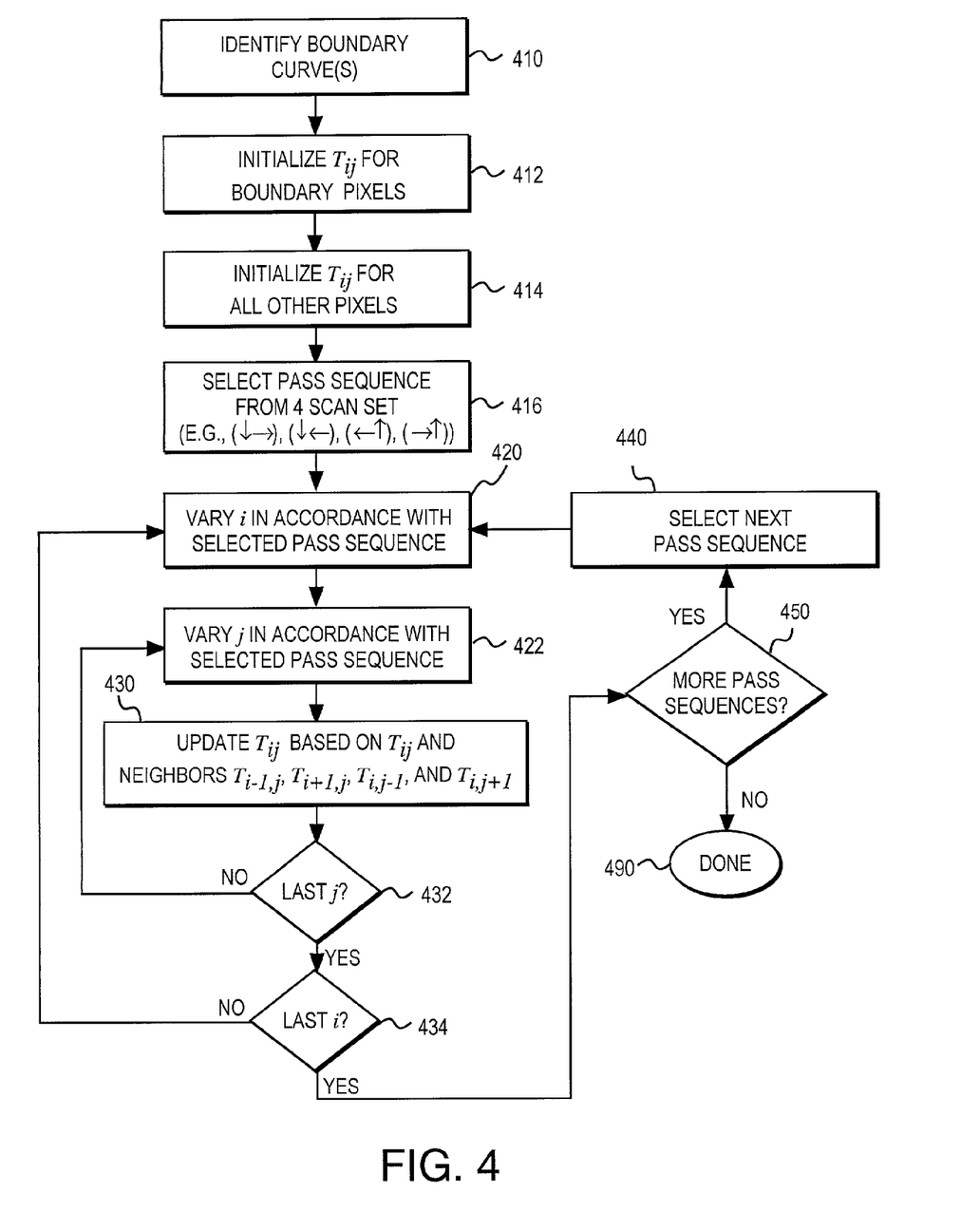
FIG. 4 illustrates one embodiment of a "four scan" approach for determining a distance map.

FIG. 4 illustrates a process for computing a source image distance map based on the gradient to the boundary curve using a four scan approach to propagate the distance information.

In step 410, the boundary pixels are identified. Any pair of adjacent pixels are classified as boundary pixels, if a boundary curve intersects an imaginary line connecting the centers of those pixels. A pixel is excluded from being a boundary pixel only if there is no adjacent pixel such that a boundary curve intersects an imaginary line connecting the centers of the pixels. This implies that pixels with centers up to $h\sqrt{2}$ from the boundary curve (i.e., up to ~1.414 pixels) may be classified as boundary pixels.

In step 412, the distance values ($T_{ij}$) for the boundary pixels are initialized. In one embodiment, the precise distance from the boundary pixels to the location of the boundary curve is determined through simple geometry. Assuming measurements are made from the center of square pixels of side length h, the sub-pixel distances will necessarily be $h\sqrt{2}$ or less. These boundary pixels are "tagged" as boundary pixels to differentiate them from the non-boundary pixels that will have their distances iteratively updated. The distance values for the boundary pixels are not iteratively updated during the four scan update process.

In step 414, all other pixels are assigned a distance value of M, where M is selected to ensure that the distance value will subsequently be updated during the update process. In one embodiment, only distance values for pixels in regions near boundary curves will be utilized. The distance values for pixels outside these regions are disregarded. Accordingly, in one embodiment values of M representing a distance extending beyond the region of interest are sufficient.

The four scan approach includes the following pass sequences ($\downarrow \rightarrow$), ($\downarrow \leftarrow$), ($\rightarrow \uparrow$), and ($\leftarrow \uparrow$). Generally, the pass sequence order is not important. Step 416 selects a pass sequence from the four scan set of pass sequences.

Steps 420 and 434 establish an outer loop for varying i (e.g., the row) in accordance with the selected pass sequence. Similarly, steps 422 and 432 establish an inner loop for varying j (e.g., the column) in accordance with the selected pass sequence.

Figure 5:
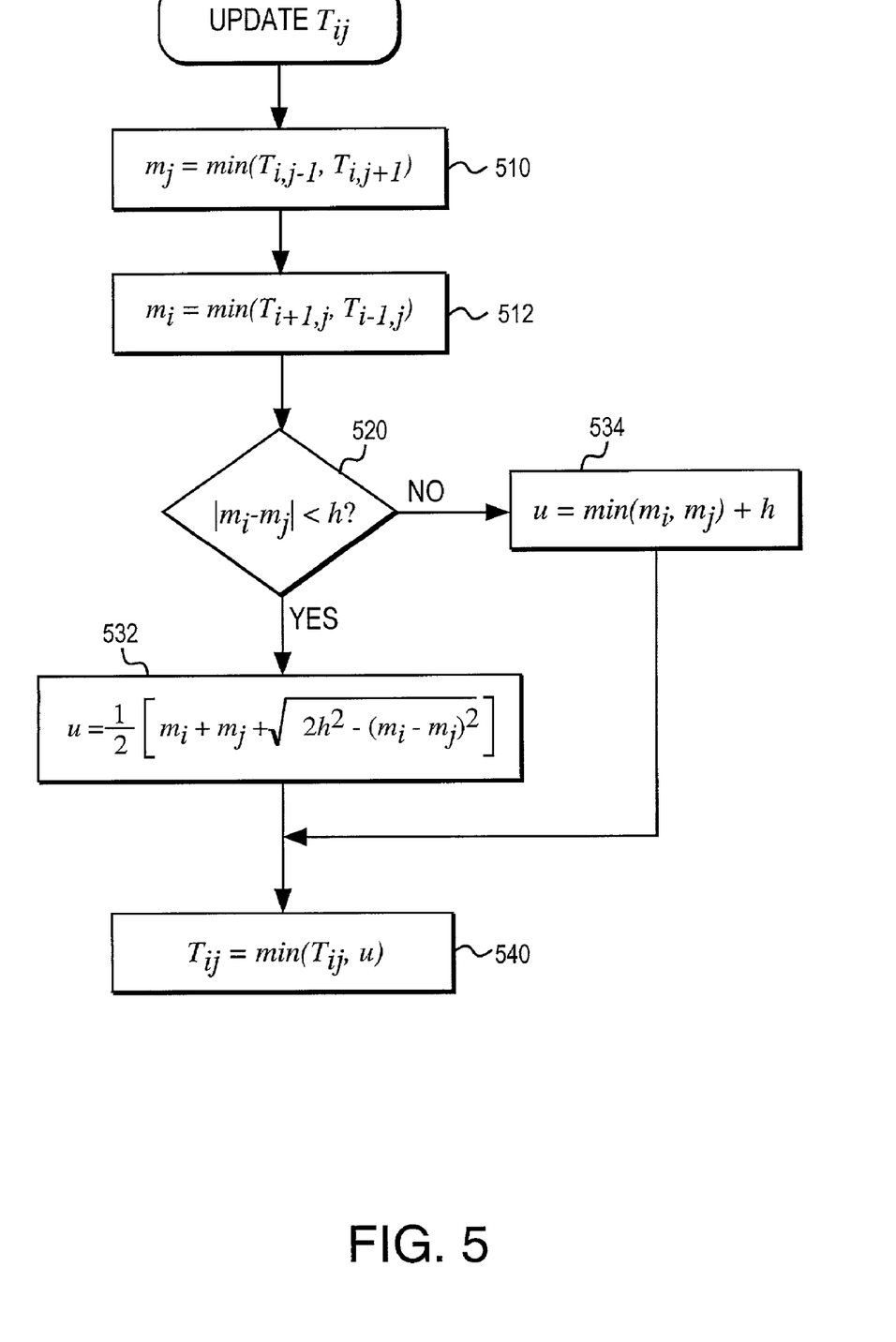
FIG. 5 illustrates an update routine for updating the distance value associated with an individual pixel.

In step 430, the update procedure is performed on pixel o using distance values from its neighbors as further detailed in FIG. 5. The distance information flows from small values near the boundary to higher values. Thus a numerical approximation to the gradient at a given grid-point must depend only on neighboring grid-points that have lower distance values. In one embodiment, $m_i$ for pixel $\{i, j\}$ is calculated as the minimum of the transforms for the upper and lower neighbors, A and B. Similarly, $m_j$ is calculated as the lesser of the transforms for the left and right neighbors, L and R. The raster scans propagate the distance information from each static point only in directions within a $\pi/2$ range. After four scans, the distance information will have been propagated in all directions. The final result is substantially independent of the order of scans except for minor differences proportional to the selected resolution at grid points near the skeleton points. The resulting distance map tends to be more accurate than Danielsson's distance maps near the boundary curves and less accurate at larger distances from the boundary curves due to logarithmic accumulation of error.

Step 450 determines whether all the pass sequences have been processed. If not, another pass sequence is selected in step 440 and steps 420–434 are repeated for the selected pass sequence. Once all pass sequences have been performed, the process is completed in step 490.

FIG. 5 illustrates the UPDATE routine (step 440 of FIG. 4) beginning with step 510. The UPDATE routine computes update values based in part on the current distance values assigned to the selected pixel and its neighbors. These distance values are referenced within the UPDATE routine as $T_{ij}$, $T_{i-1,j}$, $T_{i+1,j}$, $T_{i,j-1}$, and $T_{i,j+1}$ which represent o and the neighbors A, B, L, and R, respectively.

Step 512 calculates $m_i$ as the lesser of $T_{i-1,j}$ or $T_{i+1,j}$. Similarly, step 514 calculates $m_j$ as the lesser of $T_{i,j-1}$ or $T_{i,j+1}$.

Step 520 determines whether the absolute value of the difference between $m_i$ and $m_j$ is less than h, where h is the size of a pixel. In various embodiments, h may be defined locally within the UPDATE procedure or h may be set as a global constant.

If the difference is not less than h, then a proposed update value, u, is assigned a value corresponding to the lesser of $m_i$ or $m_j$ plus the pixel offset, h. Effectively, the proposed update value, u, is the transform value for the neighbor closest to the boundary curve plus the offset between the current pixel and the neighboring pixel (i.e., h).

If, however, the difference is less than h, then the proposed update value $$u = \frac{m_i + m_j}{2} \pm \frac{1}{2}\sqrt{2h^2 - (m_i - m_j)^2}$$

as indicated in step 532. Step 540 complies with the upwind approach and ensures that $T_{ij}$ is not increased through the UPDATE routine.

In order to improve the computational speed, the UPDATE routine of FIG. 5 may be re-written to avoid explicitly calculating u in certain circumstances. In particular, whenever a simple test can be used to determine that $u > T_{ij}$ without explicitly calculating u, an explicit calculation of u can be avoided. Let $m = \min(m_i, m_j)$ and $M = \max(m_i, m_j)$. Then u is bound as follows:

$$m + \frac{h}{\sqrt{2}} \le u \le m + h.$$

Thus an update can be avoided if $$T_{ij} \le m + \frac{h}{\sqrt{2}}.$$

Figure 6:
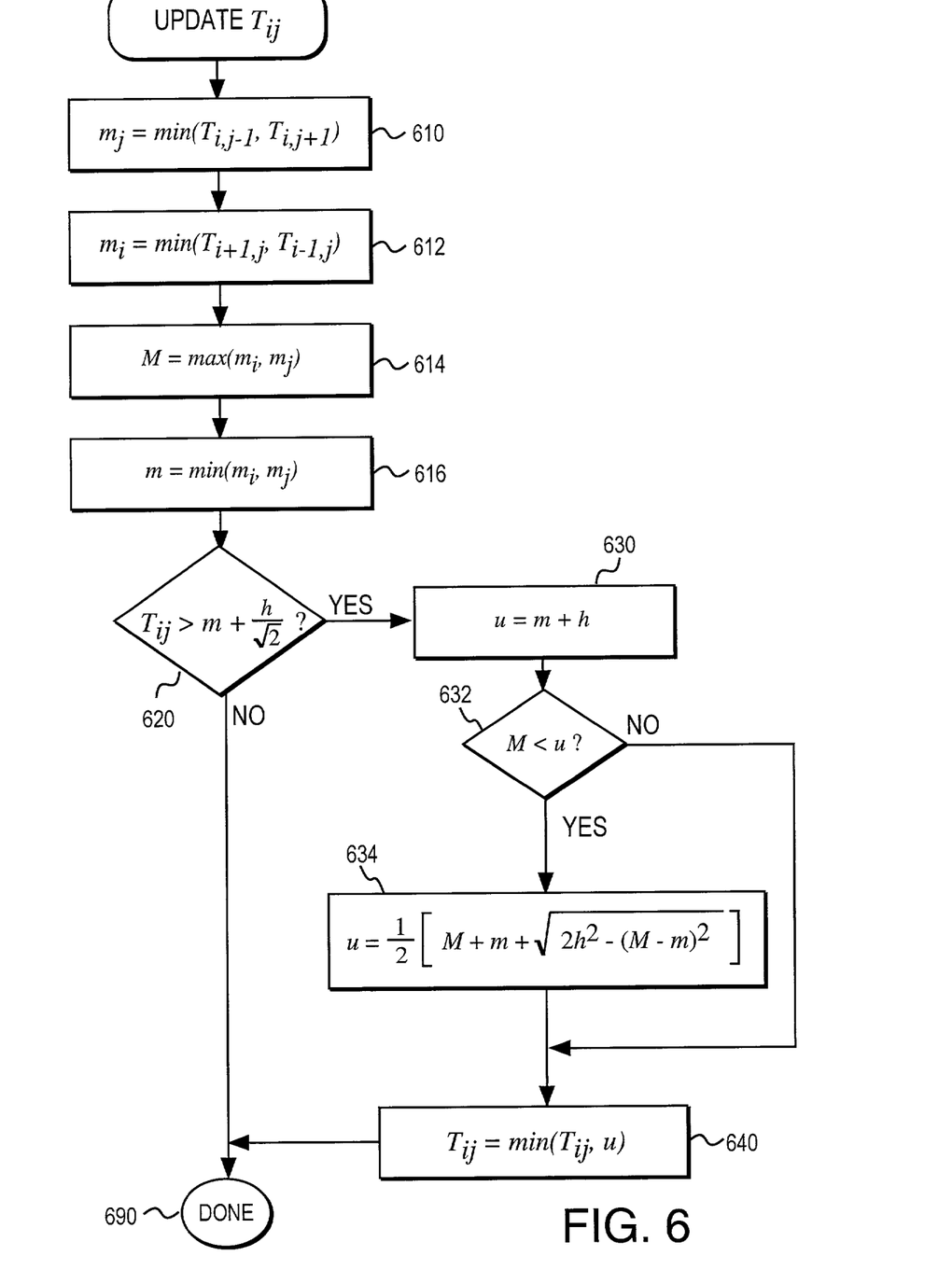
FIG. 6 illustrates an alternative embodiment of an update routine for updating the distance value associated with an individual pixel.

FIG. 6 illustrates one embodiment of an alternative implementation of the UPDATE routine of FIG. 5. Steps 610–612 are the same as the corresponding steps 510–512 of FIG. 5. Step 614 calculates $M = \max(m_i, m_j)$. Step 616 calculates $m = \min(m_i, m_j)$. The conditional and the resulting execution flow of step 620 has changed from the corresponding step 520 of FIG. 5. In particular, if $$T_{ij} \le m + \frac{h}{\sqrt{2}}$$

then no update is required and the update process terminates in step 690. If, however, $$T_{ij} > m + \frac{h}{\sqrt{2}}$$

processing continues to step 630 to set u=m+h.

Step 632 is provided to avoid performing the computationally expensive calculation of step 634. In particular, if M<u then step 634 must be performed to calculate u before performing step 640. Otherwise, step 634 is avoided. Step 640 updates $T_{ij}$ to the lesser of its current value or U. The update process is completed in step 690.

The square root function of step 620 need not actually be incurred for the update process because h and $\sqrt{2}$ are constants so that one may simply substitute the constant that $$\frac{h}{\sqrt{2}} \text{ or } \frac{1}{\sqrt{2}}$$

evaluates to in the conditional statement. The square root functions of steps 634 and 532, however, cannot be avoided as easily.

Although the process of FIG. 6 tends to reduce the frequency of performing computationally expensive step 634 as compared to the process of FIG. 5 (step 532), additional simplification may be desired for hardware implementations that do not readily support the square root function.

A low order polynomial approximation may be used to determine $$u = \frac{1}{2}\left[m + M + \sqrt{2h^2 - (M - m)^2}\right].$$

Typically, the distances are normalized such that h=1. Assuming h=1 we define $\Delta u$ to measure the deviation of u from is maximum allowed value as follows: $\Delta u = m + 1 - u$. The expression for u is transformed into the following expression for $\Delta u$:

$$\Delta u = 1 - \frac{M-m}{2} - \sqrt{\frac{1}{2} - \left(\frac{M-m}{2}\right)^2}$$

where $\Delta u$ can be written as a function of one parameter K=M−m which is restricted to K∈[0, 1].

One example of a second order polynomial approximation for $\Delta u(K)$ is as follows:

$$\Delta u(K) \approx 0.2958 - 0.5296K + 0.2291K^2$$

This approximation has a small maximum error (~0.005) and a small standard deviation (~0.0015) of the error. These errors are considerably smaller than the uncertainty in the location of the sub-pixel boundaries when the location of those boundaries is inferred from graylevel values.

Figure 7:
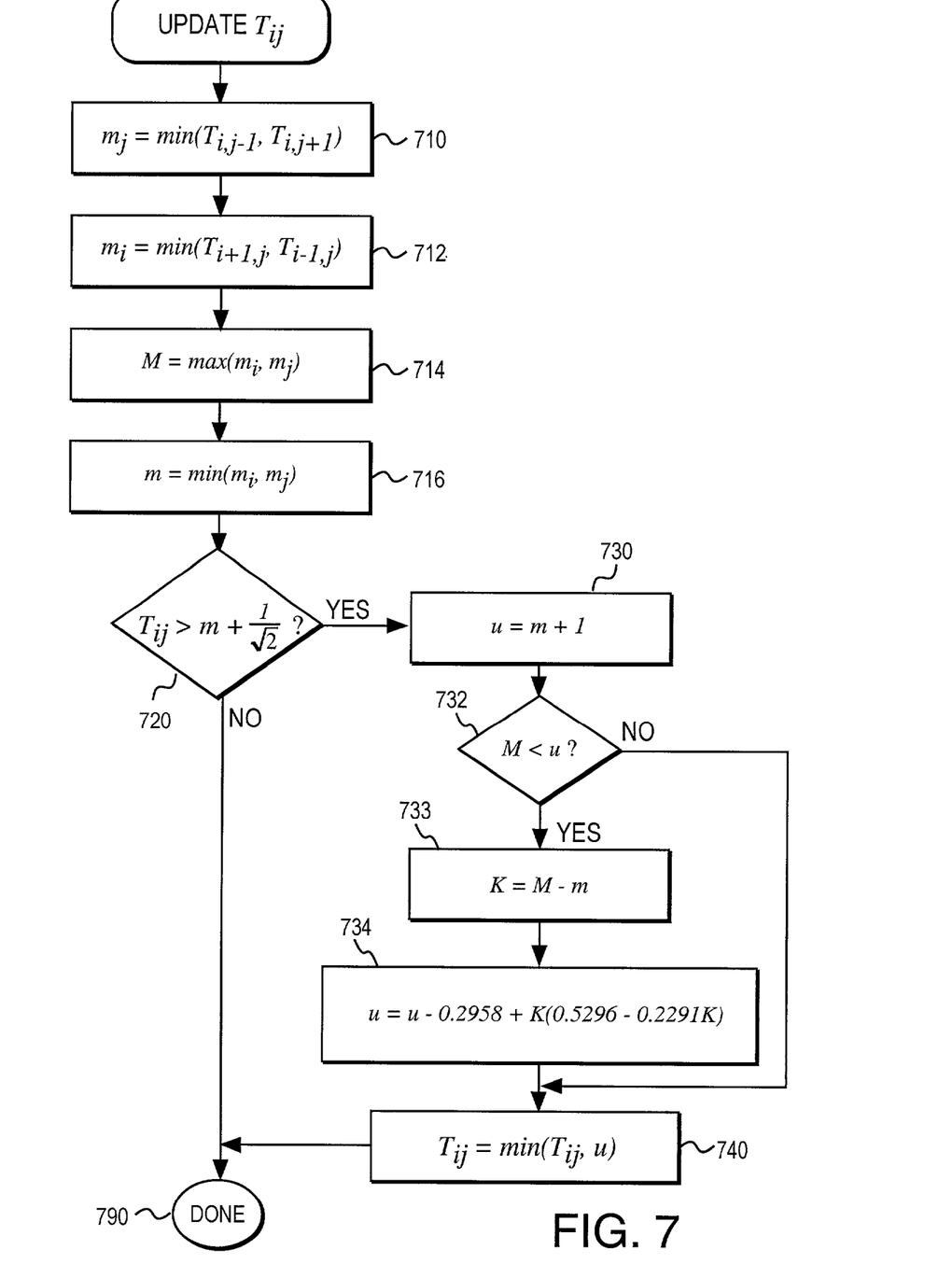
FIG. 7 illustrates an alternative embodiment of an update routine for updating the distance value associated with an individual pixel.

FIG. 7 illustrates another embodiment of the update process that estimates u with a polynomial rather than a square root calculation. Similar to FIG. 6, the more complicated calculations are avoided where possible by careful selection of the conditionals. Steps 710–716, 732, 740, and 790 are the same as the corresponding steps of FIG. 6. Steps 720 and 730 are comparable to steps 620 and 630, respectively, with the assumption that h=1. Although a square root is shown in step 720, clearly a constant value may be substituted for $$\frac{1}{\sqrt{2}}$$

to avoid actually performing the square root operation.

Step 733 has been added to calculate K=M−m for use in the polynomial approximation of step 734. As illustrated, step 734 uses a polynomial approximation to avoid using square root operations when calculating u. Higher order polynomial approximations can be made for u to achieve greater accuracy without performing square root operations. The tradeoff for greater accuracy is that the higher order polynomial approximations tend to result in a greater number of arithmetic operations and a corresponding increase in computation time.

The general process of generating a distance map based on gradients (FIGS. 4–7) may be used in an image compression and recovery process. This approach tends to better preserve the location of the contours of the image than the Danielsson approach even after compression.

In general, a first distance map having a first resolution is generated from a source image using the four scan approach of FIGS. 4–7. The first distance map is downsampled to a second distance map having a second resolution to achieve compression. A reconstructed source image of the first resolution may be subsequently generated from the second distance map. An interpolation filter is applied to the second distance map to generate an interpolated distance map. A soft threshold filter is then applied to the interpolated distance map to generate the reconstructed source image having the first resolution.

Figure 8:
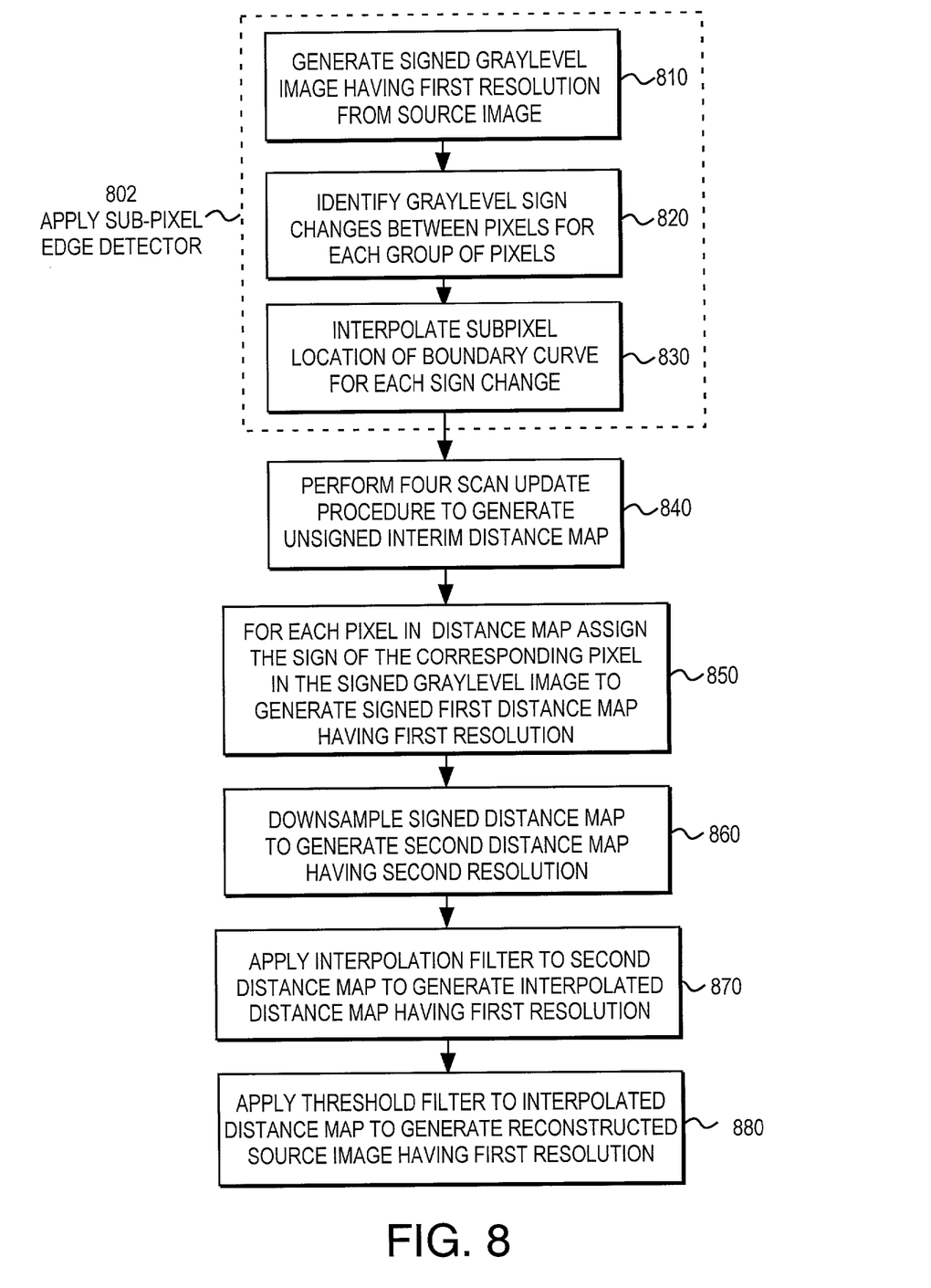
FIG. 8 illustrates a method of compressing and recovering a source image using a distance map.
Figure 9:
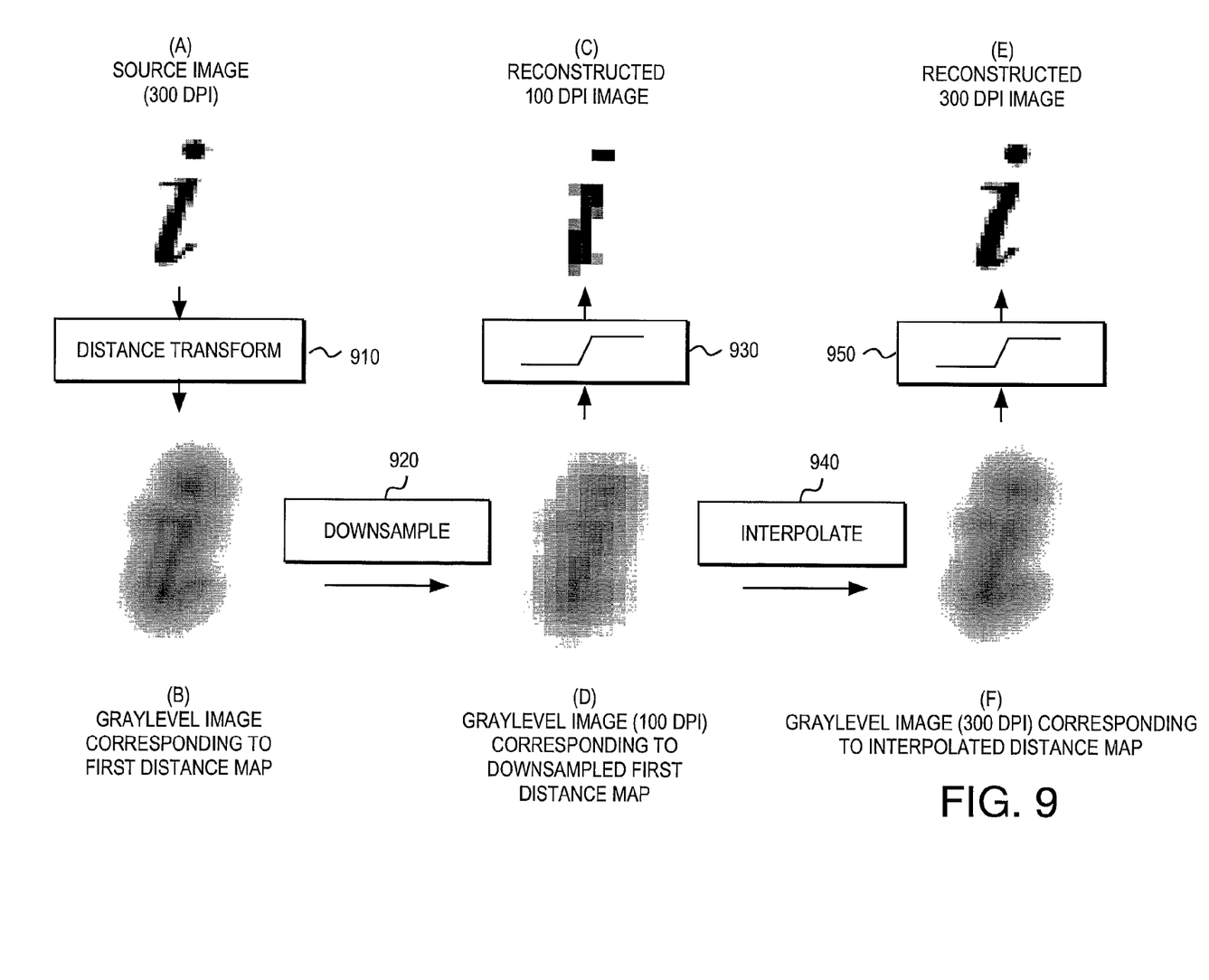
FIG. 9 illustrates application of the four scan gradient-based distance map for image compression and recovery of source images containing text.

FIGS. 8–9 illustrate the process of compression and reconstruction of the source image. To identify the location of the boundary curves with sub-pixel accuracy, a sub-pixel edge detector is applied (802) to the source image. Steps 810–830 illustrate one embodiment of a sub-pixel edge detector.

In step 810, the source image is converted into a signed graylevel image having a first resolution. If the source image is not already discretized or if the source image has a resolution other than the first resolution, discretization may be required. The source image, for example, may be a continuous tone image or a font or a typeface that is defined as a continuous object through mathematical equations expressing the boundaries in continuous parametric form. The source image may be a discretized image with a resolution higher or lower than the first resolution.

In one embodiment, the process of generating the signed graylevel image includes the step of first converting the source image into an unsigned graylevel image having the first resolution. Each pixel of the unsigned graylevel image has a graylevel value in the range [0, N]. Typically these unsigned graylevel values are integer values. A signed graylevel image can then be generated by subtracting a global threshold value or a locally adaptive threshold value from the graylevel value of each pixel of the unsigned graylevel image.

For a graylevel image having N gray levels, the global threshold can be selected such that it is approximately halfway between levels 0 and N. Thus, for example, a 256 gray level image (i.e., [0, 255]) might use a global threshold value of 127. This global threshold value is subtracted from the gray level value of every pixel in the source image to generate a signed graylevel image. In one embodiment, the threshold value is selected to ensure no pixel has a zero graylevel (e.g., 127.5).

In step 820, sign changes in graylevel values for adjacent pixels within a group or cell are identified. In one embodiment, each cell or group consists of four pixels (i.e., {i,j}, {i+1, j,}, {i+1, j+1}, (i, j+1)). A change in sign along the edges of the cell indicate an intersection with the boundary curve. In particular, if two adjacent pixels within the cell have graylevel values of opposite sign, a boundary curve necessarily passes between the centers of those pixels (i.e., a boundary curve intersects an imaginary line connecting the centers of the two adjacent pixels). Each of these pixels will be classified as a boundary pixel. The precise location of the boundary curve intersection as measured from the centers of those pixels can then be further determined from the corresponding graylevel values of those pixels.

In step 830, the location of the boundary curve intersections are linearly interpolated to a sub-pixel accuracy. This may be accomplished, for example, by weighting the distance calculations based on the graylevel values of the boundary pixels.

The four scan update procedure of FIGS. 4–7 is then performed in step 840 to generate an unsigned interim distance map. This distance map will have distances calculated to sub-pixel accuracy and sub-pixel precision. Computationally, the Euclidean distance is calculated with sub-pixel precision. In addition, sub-pixel accuracy is available because the location of the boundary curve from a boundary pixel is measured to sub-pixel lengths.

The distances in the unsigned interim distance map are Euclidean distances and thus are all positive. Step 850 assigns the sign of the corresponding pixel in the signed graylevel image to each pixel in the unsigned interim distance map in order to generate a signed first distance map having the same resolution as the unsigned graylevel image. Thus, for example if the unsigned distance map has a Euclidean distance value of 3.5 at pixel (i, j) and the signed graylevel image has a value of (−30) at the same pixel location, then the negative sign is applied to the distance value resulting in −3.5 at the same (i, j) location in the signed first distance map.

In step 860, the signed distance map is downsampled to generate a second distance map having a second resolution. In one embodiment, the second resolution is less than the first resolution. With a lower resolution, the second distance map requires less storage space than the first distance map or the source image. For applications such as compression of source images consisting predominately of text, only the regions near the boundary curve are of particular interest. Further compression can be realized by discarding distance map information outside the region of interest near the boundary curves.

If the second resolution is sufficient, recovery of the source image can be accomplished by application of a soft threshold filter to the second distance map. This version of the source image, however, will have the second resolution rather than the first resolution. In order to reconstruct the source image to the first resolution, an additional step is required to enhance the resolution.

In step 870, an interpolation filter is applied to the second distance map of the second resolution to generate an interpolated distance map having the first resolution. In step 880, the soft threshold filter is applied to reconstruct the source image from the interpolated distance map. The reconstructed source image will have the first resolution. If the original source image was a discretized image having the first resolution, then the reconstructed source image will have the same resolution as the original source image.

In one embodiment the soft threshold filter is piecewise linear. Given two distance thresholds z1 and z2 such that z2>z1 and z1, z2 $\in$ Z, wherein Z is the realm of distance values, the graylevel value g is a function of the distance value d as follows:

$$g(d) = \begin{cases} K1; & \text{if } d \le z1 \\ f(d); & \text{if } z1 < d < z2 \\ K2; & \text{if } d \ge z2 \end{cases}$$

where K1 and K2 are pre-determined constants and f(d) is a linear function of d. In one embodiment f(d)=ad+b, where a and b are constants. In an alternative embodiment, f(d) may be selected as a non-linear function to accommodate better matching between the original source image and the reconstructed source image based on the characteristics of the boundary curves in the original source image. The function g(d) maps distance values to the unsigned graylevel values in the range [0, N]. In one embodiment K1 and K2 represent the minimum and maximum graylevels.

FIG. 9 illustrates graphically, the compression and decompression process of FIG. 8 as applied to a source image containing text. Image 9(A) represents the original source image scanned at a first resolution (300 dpi). The distance transform of FIGS. 4–5 is applied (910) to the scanned source image. Image 9(B) is a graylevel representation of the signed first distance map. The graylevel representation of the signed first distance map is generated by scaling the values of the signed distance map to the unsigned graylevel range. For example, a distance map with distance values in the range of [−12, 12] can be converted to a 256 graylevel map by mapping the [−12, 12] range to the range [0, 255]. In this case, the result is an unsigned graylevel image having the same resolution as the scanned source image.

The signed first distance map is downsampled (920) to generate a second distance map having a second resolution (100 dpi). Downsampled graylevel image 9(D) represents the second distance map. Image 9(C) illustrates the result of applying a soft threshold filter (930) to the second distance map. Alternatively, an interpolation filter (940) may be applied to the second distance map to generate a reconstructed first distance map of the first resolution as represented by graylevel image 9(F). The soft threshold filter (950) may be applied to the reconstructed first distance map to generate a reconstructed source image 9(E) having the first resolution (i.e., 300 dpi).

Generally, the image 9(E) based on the reconstructed distance map at the first resolution is a better reconstruction of the source image 9(A) than is the image 9(C) based on the downsampled first distance map at the second resolution. However, image 9(E) may be appropriate for lower resolution devices such as computer monitors or display screens. Thus the same distance map (i.e., the lower resolution second distance map) can be used to provide the lower resolution image (9(C)) for display and (with minimal computational complexity) the higher resolution image for printing.

Enhancement and reconstruction of the original image is performed in the distance domain rather than the graylevel domain. Reconstruction in the distance domain offers considerable advantages over reconstruction in the graylevel domain. Enhancement processes conducted in the graylevel domain are inherently nonlinear at boundary curves. In particular, complicated nonlinear techniques are frequently required to reconstruct boundary curves in the graylevel domain. Computationally simple and efficient linear reconstruction methods can be used in the distance domain as contrasted with the more complex nonlinear techniques required when in the graylevel domain to achieve comparable reconstructed image quality.

Figure 10:
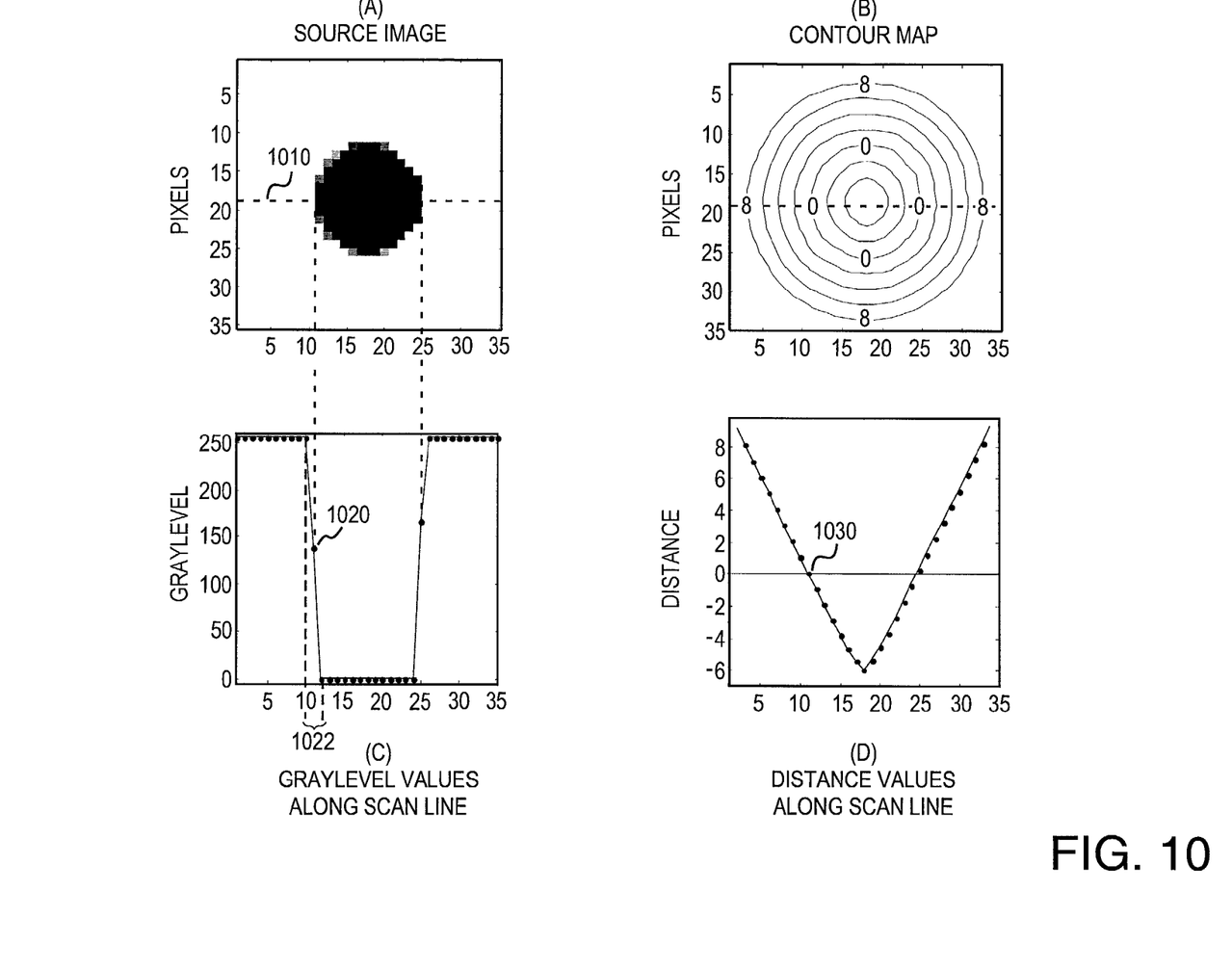
FIG. 10 illustrates a graylevel map and a distance map along a scan line of a source image.

FIG. 10 illustrates a source graylevel image 10(A) for comparing and contrasting the resulting graylevel map 10(C) and a Euclidean sub-pixel distance map 10(B) (presented in the form of a contour map) for comparing and contrasting their spatial dependence near interesting features. A cross section of the source graylevel image 10(C) and the related distance map 10(D) is plotted along scanning line 1010 for ease visualization. Large changes in graylevel can be observed in the graylevel cross-section 10(C) near the location of the boundary curves of the source image 10(A).

A loss of information near the boundary curve is disregarded or lost, determining the exact location of the boundary curve from the graylevel information is problematic. For example, eliminating every other data point (e.g., 1020) will significantly obscure the location of the actual boundary (somewhere along 1022).

In the distance map domain, location of the boundary curves corresponds to finding the zero crossings in the distance map. As can be observed from FIG. 10(D), a loss of every other data point (e.g., 1030) still allows a good estimate of the boundary curve location (i.e., the zero crossings) through simple linear interpolation. As a result, given the same reduction of information (e.g., through compression), the distance map generally permits a more faithful recovery of the location of the boundary curves than does the graylevel image. Alternatively stated, the distance map (10(B)) permits greater compression than the graylevel image (10(A)) for a given reconstructed source image quality.

In the preceding detailed description, the invention is described with reference to specific exemplary embodiments thereof. Various modifications and changes may be made thereto without departing from the broader spirit and scope of the invention as set forth in the claims.

The specification and drawings are, accordingly, to be regarded in an illustrative rather than a restrictive sense.

What is claimed is:

1. A method of generating a distance map comprising the steps of:
   a) identifying a boundary curve of a source image; and
   b) assigning a distance value to each pixel of the distance map associated with a corresponding region of the source image, wherein for each pixel, the distance value represents a distance between a center of that pixel and a nearest point of the boundary curve, wherein the nearest point is located to sub-pixel accuracy, wherein step a) further comprises the steps of:
      i) generating an unsigned graylevel image corresponding to the source image; and ii) applying a threshold value to the unsigned graylevel image to form a signed graylevel image, wherein a sign change between graylevel values of adjacent pixels indicates a boundary curve intersection, wherein the sign change identifies the adjacent pixels as boundary pixels.

2. The method of claim 1 wherein step b) further comprises the step of:
  i) calculating a distance from a center of each boundary pixel to a nearest interpolated boundary curve intersection as the distance value for boundary pixels; and
  ii) propagating distance values from each pixel to adjacent pixels to generate an unsigned interim distance map.

3. The method of claim 2 wherein for each selected pixel, $m_i$=the minimum of the distance values of the neighboring pixels above and below the selected pixel, wherein $m_j$=the minimum of the distance values of the neighboring pixels to the left and right of the selected pixel, wherein h corresponds to a pixel size, wherein Tij=a current distance value for the selected pixel, wherein a proposed update value, u, is assigned a value as follows:

$$u = \frac{m_i + m_j + \sqrt{2h^2 - (m_i - m_j)^2}}{2},$$

wherein Tij is updated to min(Tij,u).

4. The method of claim 2 wherein step b) includes the step of performing each of the following passes to propagate the distance information throughout the image: top-to-bottom and left-to-right, top-to-bottom and right-to-left, bottom-to-top and left-to-right, bottom-to-top and right-to-left.

5. The method of claim 2 wherein step b)(ii) further comprises the step of assigning a sign of each pixel of the signed graylevel image to the distance value in the corresponding location of the unsigned interim distance map to generate a signed first distance map having a first resolution.

6. The method of claim 5 further comprising the step of:
  c) downsampling the first distance map to generate a second distance map having a second resolution.

7. The method of claim 6 further comprising the step of:
  d) applying a soft threshold filter to the second distance map to reconstruct the source image, wherein the reconstructed source image has the second resolution.

8. The method of claim 6 further comprising the step of:
  d) applying an interpolation filter to the second distance map to generate an interpolated distance map having the first resolution.

9. The method of claim 8 further comprising the step of:
  e) applying a soft threshold filter to the interpolated distance map to generate a reconstructed source image having the first resolution.

10. The method of claim 1 wherein the source image comprises boundary curves defined by continuous parametric functions.

11. A method comprising the steps of:
  a) computing a first distance map of a source image;
  b) downsampling the first distance map having a first resolution to form a second distance map having a second resolution;
  c) interpolating the second distance map to generate an interpolated distance map having the first resolution; and
  d) applying a soft threshold filter to the interpolated distance map to generate a reconstructed source image having the first resolution;

wherein the threshold filter is a soft threshold filter such that distance values less than a first pre-determined threshold (z1) are mapped to a first value, wherein distance values greater than a second pre-determined threshold (z2) are mapped to a second value, wherein z1 <z2, wherein distance values between z1 and z2 are mapped to unsigned graylevel values [0, N].

12. The method of claim 11 wherein the first resolution is greater than the second resolution.

13. The method of claim 11 wherein step a) further comprises the steps of:
  i) identifying at least one boundary curve of the source image; and
  ii) assigning a distance value to each pixel of the first distance map, wherein each pixel is associated with a region of the source image, wherein for each pixel, the distance value represents a distance between a center of that pixel and a nearest point of a nearest boundary curve, wherein the nearest point is located to sub-pixel accuracy.

14. The method of claim 13 wherein step (a)(i) further comprises the step of applying a threshold value to a graylevel rendering of the source image to form a signed graylevel image, wherein a sign change between graylevel values of adjacent pixels indicates a boundary curve lies between centers of the adjacent pixels, wherein the sign change identifies the adjacent pixels as boundary pixels.

15. The method of claim 13 wherein step (b)(ii) further comprises the steps of:
  1) calculating a distance from a center of each boundary pixel to a nearest interpolated boundary curve intersection as the distance value for boundary pixels; and
  2) propagating distance values from each pixel to adjacent pixels to generate an unsigned distance map.

16. The method of claim 15 wherein step b)(ii) further comprises the step of assigning a sign of each pixel of the signed graylevel image to the distance value in the corresponding location of the unsigned distance map to form the first distance map.

17. A computer readable medium on which is embedded one or more computer programs, said one or more computer programs implementing a method of generating a distance map, the one or more computer programs comprising a set of instructions for:
  a) identifying a boundary curve of a source image; and
  b) assigning a distance value to each pixel of the distance map associated with a corresponding region of the source image, wherein for each pixel, the distance value represents a distance between a center of that pixel and a nearest point of the boundary curve, wherein the nearest point is located to sub-pixel accuracy, wherein step a) further comprises the steps of:
  i) generating an unsigned graylevel image corresponding to the source image; and
  ii) applying a threshold value to the unsigned graylevel image to form a signed graylevel image, wherein a sign change between graylevel values of adjacent pixels indicates a boundary curve intersection, wherein the sign change identifies the adjacent pixels as boundary pixels.

18. The computer readable storage medium according to claim 17, the one or more computer programs further comprising a set of instructions for:
  i) calculating a distance from a center of each boundary pixel to a nearest interpolated boundary curve intersection as the distance value for boundary pixels; and ii) propagating distance values from each pixel to adjacent pixels to generate an unsigned interim distance map.

19. A computer readable medium on which is embedded one or more computer programs, said one or more computer programs implementing a method, said one or more computer programs comprising a set of instructions for:
  a) computing a first distance map of a source image;
  b) downsampling the first distance map having a first resolution to form a second distance map having a second resolution;
  c) interpolating the second distance map to generate an interpolated distance map having the first resolution; and
  d) applying a soft threshold filter to the interpolated distance map to generate a reconstructed source image having the first resolution;
  wherein the threshold filter is a soft threshold filter such that distance values less than a first pre-determined threshold (z1) are mapped to a first value, wherein distance values greater than a second pre-determined threshold (z2) are mapped to a second value, wherein z1<z2, wherein distance values between z1 and z2 are mapped to unsigned graylevel values [0, N].

* * * * *